United States Patent [19]

Cook et al.

[11] 3,903,338

[45] Sept. 2, 1975

[54] CONTINUOUS DIFFUSION COATING

[75] Inventors: George Cook, Wilmington, Del.; Alfonso L. Baldi, Drexel Hill, Pa.

[73] Assignee: Alloy Surfaces Company, Inc., Wilmington, Del.

[22] Filed: Dec. 19, 1973

[21] Appl. No.: 426,326

Related U.S. Application Data

[62] Division of Ser. No. 159,175, July 2, 1971, Pat. No. 3,824,122.

[52] U.S. Cl. ................ 427/444; 427/301; 148/13.1

[51] Int. Cl. ............................................. C23c 9/00

[58] Field of Search ........................ 117/107.2 P, 38

[56] References Cited

UNITED STATES PATENTS 3,801,357 4/1974 Baldi ........................... 117/107.2 P

*Primary Examiner*—Mayer Weinblatt
*Assistant Examiner*—Harris A. Pitlick
*Attorney, Agent, or Firm*—Connolly and Hutz

[57] ABSTRACT

Workpieces are diffusion coated by packing them singly in individual snugly fitting retorts with a diffusion coating pack, heating the packed retorts to diffusion coating temperature for a time adequate to effect the desired coating, and then rapidly cooling the retorts. The small amount of pack surrounding the workpiece permits very rapid cooling without the need to apply a cooling liquid to these small retorts, and entire coating operation is accordingly well suited for coating nickel-base superalloys that should before use be subjected to solution heat treatment and rapid cooling with or without subsequent aging. The diffusion coating can then be conducted under solution heat treating conditions. Tubular retorts can be used.

3 Claims, 9 Drawing Figures

CONTINUOUS DIFFUSION COATING

This application is a division of application Ser. No. 159,175, filed July 2, 1971, and now U.S. Pat. No. 3,824,122.

The present invention relates to diffusion coating, and more particularly to the diffusion coating and subsequent rapid cooling of workpieces.

Among the objects of the present invention is the provision of novel methods and apparatus for expeditiously diffusion coating and rapidly cooling workpieces.

The foregoing as well as additional objects of the present invention will be more fully understood from the following description of several of its exemplifications, reference being made to the accompanying drawings wherein.

According to the present invention workpieces are diffusion coated by providing a retort which is a snug fit all around for the portions of a single workpiece to be coated, packing those portions of the workpiece in the retort with a diffusion coating powder pack so that there is at least a little thickness of pack contacting all of said workpiece portions, and then heating the packed assembly to a diffusion coating temperature. After the heat treatment is completed the packed retort cools down very rapidly not only because the retort is of minimum size and therefore of high surface-to-volume ratio, but because the thermal insulation effect of the powder in the pack is reduced by reason of the relatively shallow depth of pack between the outer surface of the workpiece and the inner surface of the retort.

Thus a cylindrical steel retort having a diameter of 1 ½ inches when snugly packed with a workpiece which has portions extending to about one-fourth inch from the retort's inner surface, and standing in a tray, will upon removal from a furnace where it has been heated to 2,000°F, cool down to about 1,000°F in about 20 minutes. Moreover if a flow of cold flushing gas is permeated through the tray during the cooldown, the 1,000°F temperature can be reached in about 10 minutes. Such rapid cooling rates are particularly suited for conducting the diffusion coating as a heat treating operation such as is normally practiced with nickel-base superalloys. To develop the maximum strength of such superalloys they are given a solution heat treatment at 1,975° to 2,200°F. for a prescribed time, and then rapidly cooled to below about 1,200°F followed by an aging heat treatment at 1,200° to 1,900°F. The solution heat treatment causes the hardening phase to dissolve in the continuous metal phase, and at the rate of at least 15°F, preferably 25°F or more per minute a cooldown causes the hardening phase to precipitate out as very fine particles that give the greatest hardening effect. This is particularly desirable for jet engine blades and vanes where maximum strength is needed at operating temperatures as high as 1,600°F and higher, and even at temperatures higher than the aging temperature.

Figure 1:
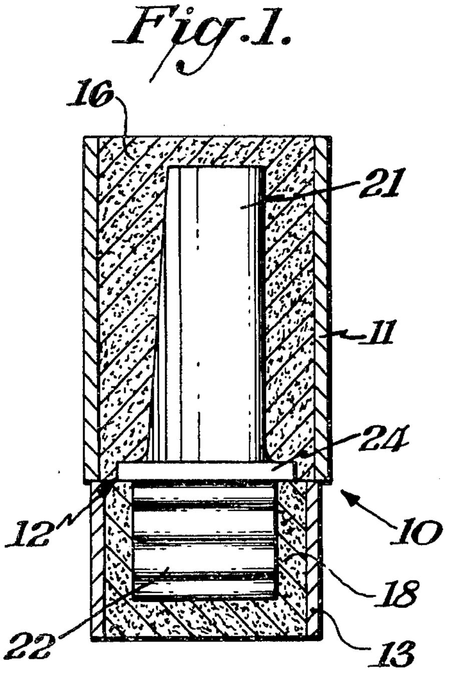
FIG. 1 is a vertical sectional view of a workpiece packed for subjection to a diffusion coating in accordance with the present invention.

Turning now to the drawings, FIG. 1 shows a workpiece 12 packed in a two-piece retort 10 composed of two cylindrical tubes 11 and 13. A powder diffusion coating pack 16 fills the space around the upper portion 21 of the workpiece in tube 11, and a powder masking pack 18 fills the space around the lower portion 22 of the workpiece in tube 13. The workpiece is shown as a jet engine blade the upper portion 21 of which is an airfoil and the lower portion 22 a mounting root. A buttress flange 24 separates the upper and lower portions.

The blade 12 can for example be made of the nickel base superalloy IN–738 having the following composition:

| | |
|---|---|
| Carbon | .17% |
| Chromium | 16.00% |
| Cobalt | 8.50% |
| Molybdenum | 1.75% |
| Tungsten | 2.60% |
| Tantalum | 1.75% |
| Columbium | 0.90% |
| Aluminum | 3.40% |
| Titanium | 3.40% |
| Boron | .01% |
| Zirconium | .10% |
| Nickel | Balance |

This alloy achieves its best combination of mechanical properties when heated at 2,050°F for 2 hours, then cooled to below 1,000°F at least as rapidly as is effected by standing in air, then heated to 1,550°F for 24 hours followed by another such fast cooldown to below 1,000°F. The packing arrangement of FIG. 1 is designed for diffusion coating of a blade airfoil with an essentially aluminum coating, without coating the blade root. Because of the throwing characteristics of such coatings, the root will tend to be coated even though not in contact with the diffusion coating pack. To make sure that no coating whatever reaches the root it is packed in a masking pack that can consist essentially of $Ni_3Al$ diluted with alumina. This or any of the other masking compositions disclosed in Belgian Pat. No. 752,651 can be used and are particularly desirable inasmuch as they keep the superalloy surface they engage from undergoing changes such as significant loss of alloying ingredients, that could significantly weaken it.

Figure 2:
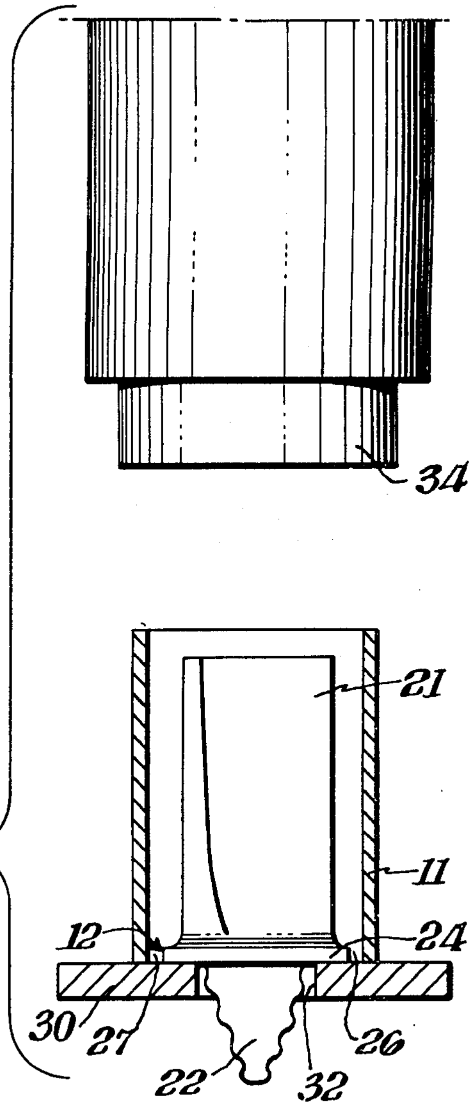
FIG. 2 is a similar view of a stage in the preparation of the pack unit of FIG. 1, the workpiece being shown as seen from one side.

One simple technique for effecting the packing of FIG. 1 is illustrated in FIG. 2. The latter figure shows the blade 12 placed on a support plate 30 that has an opening 32 which receives the blade root 22. Buttress 24 rests against the plate and supports the blade in the illustrated position. A cylinder 11 which can be plain carbon steel open at both ends, is slipped over the upstanding airfoil section 21 of the blade and is arranged to be a snug fit so that spaces 26 and 27 between the outer corners of the buttress, which is generally rectangular, and the inner surface of the tube 11 is about 3/16 of an inch. Coating powder is then poured into tube 11 around the airfoil 21 until it fills the tube and preferably piles up somewhat above the tube top. The buttress 24 is arranged to substantially cover opening 32 so that the coating powder does not significantly find its way past plate 30. If desired the powder can then be compacted as by means of a powerdriven ram 34, under a pressure of about 400 pounds per square inch where the powder is of very fine particle size such as finer than 200 mesh. Coating powders of this type are shown in Canadian Pat. No. 806,618 granted Feb. 18, 1969, as well as in U.S. Pat. No. 3,257,230 granted June 21, 1966. In case the coating powder stands above the top edge of tube 11 after compacting, some can be scraped off if a generally flat surface is desired. On the other hand if the ram 34 reaches the upper edge of tube 11 before full compacting pressure is developed, the amount of powder is inadequate and the ram can then be retracted, additional powder added to the top of tube 11 and the ramming repeated until the ramming pressure is reached with the ram not quite contacting the upper edge of tube 11.

The foregoing compacting step will leave the blade 12 securely held in tube 11 so that the ram can be withdrawn and the tube manipulated as desired without having the powder spill out. Where compacting is not used a cover can simply be placed over the top of tube 11 to keep the powder from spilling. The tube is then turned upside down, placed in upside-down position on support 30 and tube 13 then slipped over the upstanding root 22. Masking powder can then be poured into tube 13 and if desired compacted by the same ram to provide a powder surface as shown in FIG. 1.

Tubes 11 and 13 are illustrated in FIG. 1 as of slightly different diameters. While for greater exactness in packing it is helpful to have the sizes so related that one retort tube end is engaged by the other around its entire circumference, that is not essential. So long as any packing pressure used to compact the powder in both tubes are about the same or the second is less than the first, the compacting applied to the second tube will not significantly affect what has been compacted in the first tube even though the second tube has one end in position to penetrate into the powder pack of the first tube or the first tube has its end positioned to penetrate into the powder being compacted in the second tube.

It is not necessary to have the outer surfaces of the packed powder flat and level with the mouths of their respective tubes. However such leveling provides a convenient gauge of the thickness of the powder layer between the ambient atmosphere and the nearest portions of the blade. These outermost portions should be covered and handling tolerances make it desirable to have the covering powder layer at least about 1/16 of an inch thick. Such a thickness can be formed with the tubes 11 and/or 13 slightly longer than needed, and the ram 34 shaped so that is is received by the open mouths of the tubes with the compacting effected in such a way that the upper surface of the compacted powder is below the mouths of the tubes. In this type of arrangement it is helpful to have the mouths of both tubes 11 and 13 about the same diameter so that the same ram can be used on both ends of the packing.

An alternative packing technique is to use a single tube long enough to receive the entire blade and to loosely fit a supporting block in the tube near one of its ends, the block having a socket that receives the blade root and faces the other end of the tube. The blade can then be inserted with its root received in the socket in the block, powder 16 packed in while the tube is held with its block-carrying end on a support that also supports the block. In this condition the powder packed in the tube can be compacted, after which the tube can be lifted away from the support to let the block fall out, and then inverted to receive the packing 18.

While cylindrical tubes of circular cross-section are generally most convenient to use, the tubes can have any other cross-section. It is preferred that they snugly fit all around the portions of the blade which they surround since in this way the thickness of the powder pack between the outer surface of the blade and the adjacent inner surface of the tube can be kept small throughout. The thickness can be as much as an inch or so, so long as in at least some portions the thickness is reduced to about one-fourth inch or less. At these locations where the pack thickness is small, transfer of heat is very rapid and inasmuch as the blades are metallic the entire body of the blade will rapidly cool even where only the four corners of the buttress are thermally insulated by one-fourth inch of powder pack. A cylindrical tube of circular cross-section is accordingly perfectly adequate. Indeed the leading and trailing edges of the airfoil would generally be only ⅛ to ¼ inch farther away from the inner surface of the surrounding tube than the buttress corners are.

Inasmuch as the diffusion coating powder as well as the masking powder generally contain as much as 50 percent or more inert materials such as aluminum oxide or kaolin in order to reduce the danger of having particles of the pack sinter against workpiece surfaces, these powders have a relatively high thermal insulating effect. The heat transfer through some powders is accordingly much slower than it is through metal and even through air or other gases. The "snug fit" in a retort is defined as such a packing as to cause cooling of a packed workpiece to take place at the rate of at least 15°F per minute when the retort at 1,900°F is placed in still air. Retorts having a volume of as much as 1/5 cubic foot will show such rapid cooling. For greater effectivenss however the tubes can be cylinders of oval or rectangular cross-section and thus be even a more snug fit around the blade. Furthermore tubes 11 and 13 can have different cross-sectional shapes and be differently oriented with respect to their workpiece portions, in addition to having different widths.

Figure 3:
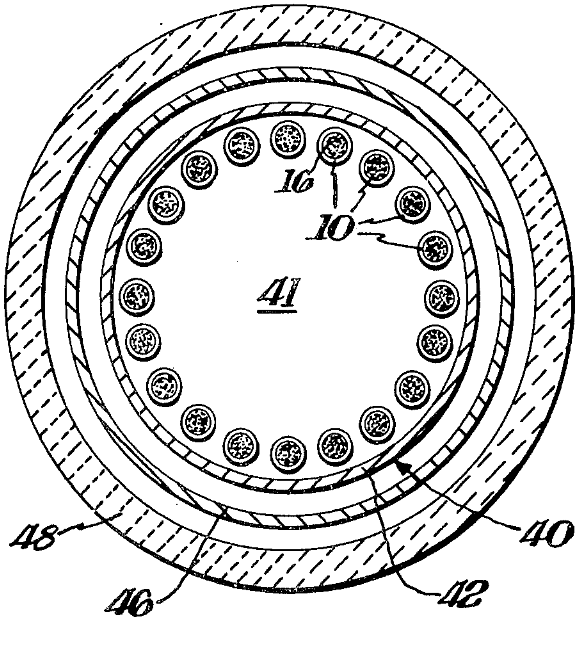
FIG. 3 is a plan view of one arrangement typical of the present invention for effecting the heat treatment of packed units such as shown in FIG. 1.

FIG. 3 shows an arrangement by which a batch of assembled retorts as illustrated in FIG. 1, are subjected to the diffusion coating treatment. A tray 40 having a bottom wall 41 and an upstanding marginal side wall 42, is arranged to hold one or two marginal rows of packed retorts 10 with the retorts spaced from each other a small distance. A loosely fitting cover is then applied over the top of the tray walls 42 and the tray then inserted in a diffusion coating furnace retort 46 having a tightly fitting cover and arranged to maintain the desired atmosphere within the furnace retort. As shown in Belgian Pat. No. 752,651 the furnace retort can have its cover equipped with gas inlet and outflow tubes through which a flushing gas is passed during the diffusion coating operation. Several trays loaded in the manner illustrated in FIG. 3 can be stacked in such a furnace retort to increase the batch size.

The firing is rapidly effected inasmuch as the amount of powder present around each workpiece is exceedingly small. The workpiece temperatures are readily followed by packing a thermo-couple in one of the small retorts 10 in place of the workpiece and having the thermocouple leads run past the loosely fitting tray cover and through the furnace retort cover to the outside where the thermocouple signals can be observed.

The temperature outside tray 40 can also be monitored and generally a small thermal lag is observed in the heat-up between the temperatures of the workpieces and that of the space around trays 40. After the diffusion coating temperature has been reached and maintained for the desired time, the heating is terminated and the furnace retort withdrawn from the furnace, or in the case of a shelltype furnace the furnace shell 48 removed from around the furnace retort. Passage of the flushing gas through the furnace retort after such withdrawal or removal, can be used to speed the cooldown as by arranging for the flushing gas to be cold, that is at ambient temperature, when introduced into the furnace retort. In this way the workpiece temperatures can be brought down from about 2,000° to about 1,200°F in about 10 minutes. However even without the supplemental cooling effect of such flushing gases the cooldown generally takes place in about 30 minutes, a time period well suited to develop maximum strength in the workpieces. After such cooldown the blades still packed in their retorts 10 and still in trays 40 can then be reheated and subjected to a 1,550°F aging for 24 hours followed by another fast cooldown with or without the help of cold flushing gas. Such final fast cooldown is also at the rate of at least 15° and preferably at least 25°F per minute until the workpiece temperature comes down to about 800°F. At about 300°F the workpiece can be exposed to the atmosphere and removed from their retorts 10.

When open-ended individual retorts 10 are used, the workpiece removal is also greatly facilitated. Two-part retorts are readily separated into their two parts as by tapping or rapping against one of the two retort parts. The contents of whichever retort part the workpiece remains in are readily pushed out by a discharge ram. Pushing of the workpiece out of the retort is facilitated by first loosening a portion of the pack as with a nonmetallic rod. Separation of the two-tube retorts into their individual tubes helps to keep the diffusion coating powder 16 separate from the masking powder 18 so that each can be reused. However the total amount of powder used per workpiece is so relatively small that reuse is not of great importance.

Other types of workpieces can be diffusion coated in a manner similar to that described above and the advantages of the rapid cooldown are also obtained when diffusion coating is practiced without masking, as for example where the entire outer surface of a workpiece is diffusion coated. Jet engine vanes are examples of workpieces. generally coated in this manner.

It is also not necessary that the individual retorts 10 be tubes open at each end, and they can for instance be of one-piece construction with a floor integrally extending across the bottom of the retort.

The individual retorts need not be batch treated as in the arrangement illustrated in FIG. 3. Instead they can be treated in a generally continuous manner as by passing them in succession into a tube of a tubular furnace, pushing them through the tube so that they are heated to diffusion coating temperature for a time adequate to effect the desired coating, successively withdrawing the so-heated retorts from the furnace tube as fresh retorts are pushed in, and emptying the withdrawn retorts so that they can be repacked. The individual retorts can substantially fill the cross-section of the tube. The retorts can be pushed to cause them to slide along the floor of the tube and push each other in a row through the tube.

A protective gas can be flushed through the tube to maintain a protective atmosphere in the diffusion coating zone, the gas having a density different from air, and the tube having loading and unloading openings at a level to which any air present tends to flow. The flushing gas can be hydrogen, with the pressure in the tube below atmospheric to minimize leakage of the hydrogen out of the tube.

Figure 4:
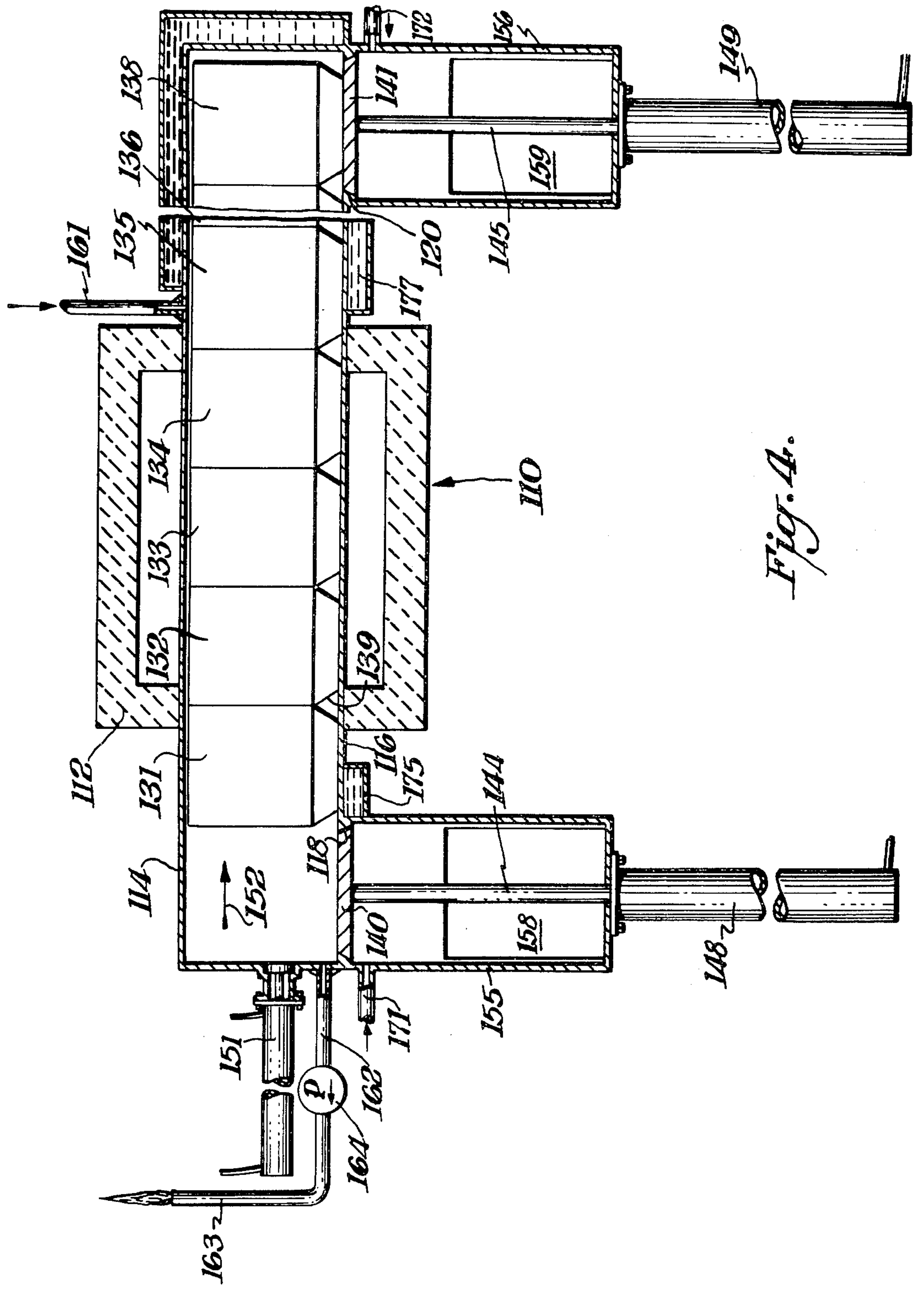
FIG. 4 is a vertical sectional view of a modified arrangement pursuant to the present invention for effecting such heat treatment.

A continuous operation is illustrated in FIG. 4 which shows a tubular of muffle furnace 110, the muffle or firing section 112 of which surrounds the central portion of a work-receiving tube 114 having a rectangular cross-section. The floor 116 of tube 114 has at either end of the tube, openings 118, 120 large enough to permit introduction and removal of a work-holding retort, several of which are shown in the tube at 131, 132, 133, 134, 135, 136 and 138. Removable plug-like floor segments 140, 141 are shaped to be received in openings 118, 120 respectively and effectively keep those openings closed when there is no loading or unloading of the furnace to be carried out. Floor segments 140, 141 are carried on separate lift rods 144, 145 connected for vertical reciprocation of pneumatic cylinders 148, 149 respectively. A pusher arm 151 fits through the end wall of tube 114 at one end of the tube and is also connected for pneumatic operation to push the retorts toward the right as shown by arrow 152, when they are introduced into the tube on floor segment 140. Down tubes 155, 156 surround the loading and unloading openings 118, 120 and project below them so as to envelop the space immediately below those openings. One or more side windows 158, 159 can be provided in the down tubes 155, 156 to permit lateral introduction and removal of the retorts.

Inlet 161 is shown as connected to an upper portion of tube 114 at the discharge end of muffle 112 for the introduction of a protective gas into the tube, and an outlet for that gas is shown at 162 at a lower portion of the tube leading to a burnoff exit 163. A pump 164 can be provided in outlet 162 to help exhaust and maintain a slightly subatmospheric pressure within tube 114. Additional inlets for protective gas are shown at 171, 172 as connected to the upper portions of the down tubes 155, 156. Water jackets can, if desired, be applied to tube 114 to effect cooling and in the illustrated construction a small water jacket 175 is located on the outside of the tube floor adjacent opening 118 and between it and the muffle unit 112. This helps to keep opening 118 sealed shut during use of the furnace, particularly where a gasket is fitted between the opening and the floor segment. Another and larger water jacket 177 can surround tube 14 just beyond the muffle unit to help cool the contents of the tube in that location. Water jacket 177 can be divided into two parts longitudinally spaced from each other along the length of the furnace tube 114, and another muffle (not shown) inserted between them to provide a thermal aging treatment zone.

Furnace 110 can be used for diffusion coating operations that are conducted with a protective atmosphere around the retorts as in U.S. Pat. No. 3,449,159, and can also be used for diffusion coating operations such as described in U.S. Pat. No. 2,851,375 where no such protective atmosphere is needed around the retorts. For use with such protective atmosphere the furnace can be turned on, tube 114 flushed with protective gas like argon, nitrogen or neon, until substantially all the air has been displaced, following which the protective gas is switched to hydrogen. Up to this point loading and unloading segments 140, 141 can be kept closed to improve the flush effectiveness. Loading segment 140 is then lowered and a previously loaded retort placed on that segment while it is in lowered position after which the floor segment is raised to the position, illustrated, thus carrying the retort into the loading end of tube 114. Pusher arm 151 is then actuated to push the retort into the position shown at 131 in the figure. As shown, the retort can have a height at least about 90 percent that of the inside height of tube 114. This not only keeps the retort from tipping over but it also causes the retort to act as a heat shield, reducing the loss of heat from the muffle or firing zone that would otherwise radiate through tube 114 toward its loading end. Making the retort at least about 90 percent as wide as the inside width of tube 114 also helps in this respect.

At position 131 the advancing side of the retort begins to get heated up so that the ultimate heating to operating temperature is expedited. Another retort can now be loaded into tube 114 by repeating the above loading steps. This time however the pushing action of pusher 151 moves the first retort into position 132 and the second retort into position 131. Retort 132 is then exposed to the maximum furnace heat and soon reaches the temperature desired for the diffusion coating. Retort 131 acts as a heat shield as explained above, and thus helps retort 132 to rapidly reach the desired temperature. If it is desired to also shield the right-hand end of the muffle or firing unit 112, the furnace tube can be preloaded with a retort at position 135, which retort can be empty or filled with nothing more than thermal insulating powder or if desired the same powder used as the pack in the diffusion coating. In fact the furnace can be filled by preloading with five such preloaded retorts so that the first work-containing retort then introduced into position 131 goes through a treatment cycle which all subsequently loaded retorts repeat exactly.

When the furnace is full of retorts, as shown in the figures, and enough time has elapsed to call for the introduction of another retort, the retort at position 138 is withdrawn by lowering floor segment 141 to carry that retort down adjacent unload window 159. That retort can then be removed through that window while a fresh retort is loaded into the load end of tube 114 and the pusher ram 151 actuated to advance all the retorts one station. The unloading and loading is then repeated at appropriate intervals.

At burn-off exit 163 the emerging gases which are essentially hydrogen, can be conveniently burned, thus reducing explosion hazards and also providing an indication of hydrogen flow.

When a floor segment such as a load segment 140 is lowered, the tube 114 is opened to the atmosphere in a down tube. The introduction of protective gases into the down tubes provides a protective plug of gas some of which is drawn into the tube 114 by operation of pump 164, until the floor segment is returned to its uppermost position. When hydrogen is used as the protective gas in tube 114 it is desirable that the protective gas in the down tubes be of the inert gas type such as helium or nitrogen. The introduction of some helium or nitrogen into the tube 114 to mix with the hydrogen in that tube has no untoward effect on the diffusion coating yet the helium or nitrogen can escape through window 158 for example, without creating any significant hazard. In the interest of economy the helium or nitrogen flow can be held to the minimum so that escape through window 158 is quite gradual. Also the presence of appreciable concentrations of nitrogen in those positions of the furnace which are above 700°F is not desired inasmuch as it tends to convert the pack metal to less reactive nitrides.

In the apparatus illustrated in FIG. 4 three retorts are being simultaneously heated to diffusion coating temperature. Accordingly if the entire heat treatment is to extend for 1 ½ hours a fresh retort can be inserted every ½ hour and the line of retorts stepped along. As the heated retorts reach position 135 they begin to cool and water jacket 177 greatly speeds such cooling as does the passage of cold flushing gas. One such cooling station is generally sufficient to cause the workpiece to cool down from coating temperature at the rate of 15°F or more per minute to about 1,000°F. The retorts can then go through a second muffle heating zone to age them before they reach the cooling position 136, or they can go directly from 135 to 136 if the second muffle is not to be used. A single cooling position 136 will suffice to cool the workpieces from a thermal aging treatment down to about 450°F or below, at which temperatures the retorts can be brought out into the ambient air if they are covered as with a loosely fitting cover. If desired a supplemental cooling station can be provided in tube 114 inasmuch as two successive waterjacketed stations bring the final workpiece cooldown temperature to about 300°F or below.

The relatively large dimension of the retorts with respect to the furnace tube as pointed out above, helps assure proper sliding of the retorts through the tube by the pusher arm. The retorts can also have substantial width in the direction of travel, that is a longitudinal width at least about half the retort height and preferably at least 100 percent of the retort height. Also the lower corners of the retort can be tapered as shown at 139, to help them slide over the joints between the floor 116 and segments 140, 141, as well as to help guide the retorts out through unloading opening 120 in the event of a little misalignment. The tapers 139 also help with the unloading of the contents of the retorts inasmuch as the inside edges and corners are the most difficult parts to clean out.

The furnace can be arranged to simultaneously fire any number of retorts and by increasing the fired number the furnace loading frequency is correspondingly increased. A furnace that simultaneously subjects ten retorts to maximum firing temperature can have the retorts introduced into the furnace at 9-minute intervals. Intervals of this magnitude are adequate for simple handloading of the retorts even where each retort contains a multiplicity of workpieces. However the retorts can be automatically loaded by machine, as for example where several furnaces are to be operated simultaneously.

Figures 5A, 5B, 5C, 5D, 5E:
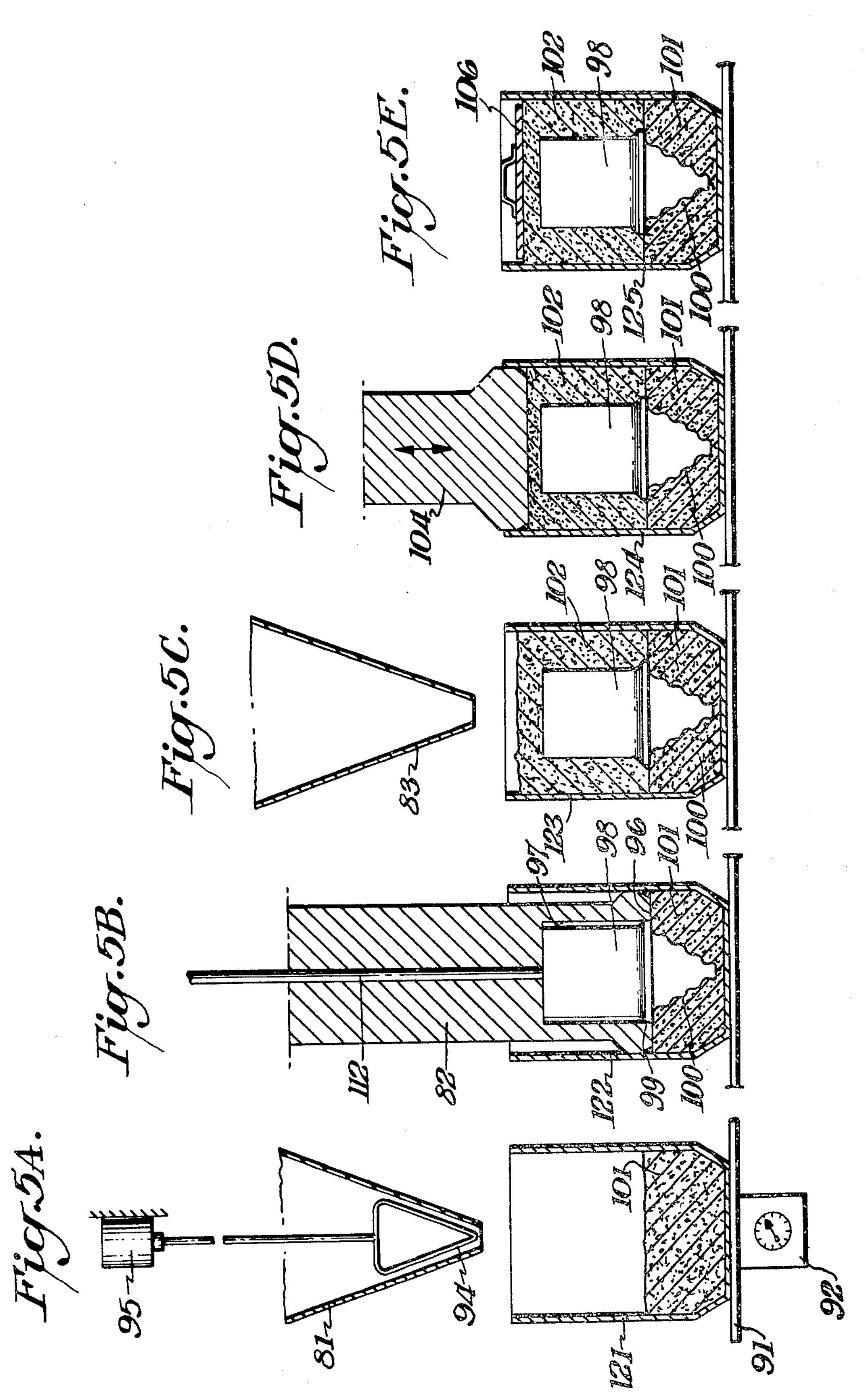
FIGS. 5A through 5E are similar views of stages in a modified technique for preparing workpieces for diffusion coating representative of the present invention.

The loading of a single workpiece in a retort is illustrated in FIGS. 5A through 5E. FIG. 5A shows a retort 121 positioned under a loading hopper 81. The hopper contains powder used in packing the workpieces and the powder is discharged in a batch 101 into the retort 121. In order to control the amount of this batch the retort is carried on a pan 91 of a weighing scale 92 which can automatically terminate the flow of powder. Since powders of this type are sometimes non-fluent, their discharge from the hopper 81 can be effected by a wire-type agitator 94 rotated as by an electric motor 95. With such non-fluent materials the flow stops fairly promptly when the rotation of the agitator stops, and by connecting a motor energizing relay to appropriate electrode contacts on scale 92 the loading of a first layer of powder 101 is conveniently effected in an automatic way.

FIG. 5B shows another loading station where a retort 122 carrying the first layer of powder 101 is subjected to the action of a compacting ram 82. This ram has a face 96 which engages and compacts the powder 101 and also has a recessed socket 97 in which is fitted a workpiece 98 such as a jet engine blade to be coated. These blades are very accurately dimensioned so that it is no problem to have the mouth 99 of the socket 97 shaped to tightly receive a portion of the workpiece such as the projecting buttress illustrated. A single outward stroke of ram 82 will in the illustrated apparatus press the lower end 100 of the workpiece 98 into powder 101 and also compact the powder against that lower end. Ram 82 can then be withdrawn and if the workpiece is not locked in by the powder pressed against its lower convolutions, a knockout pin 112 can be provided to help hold the workpiece embedded in the powder during the withdrawal of ram 82.

FIG. 5C shows another loading station in which a retort 123 is under a loading hopper 83. Retort 123 already carries powder 101 and embedded workpiece 98, and at this station the retort is filled or substantially filled with an additional layer of powder 102. Powder 102 can be introduced in the same manner as powder 101 at station 5A, except that at station 5C there is no need to use the weight control to terminate the loading of the powder. Since it is important to cover the entire workpiece with powder 102, that powder is permitted to pour in in generous excess and can even overlow over the top edge of the retort without harm. There is enough tolerance in the amount of powder required that the powder can be controlled with sufficient accuracy by timing the discharge from hopper 83 or timing the operation of an agitator in that hopper.

The next step in the filling of a retort is shown in FIG. 5D. Here retort 124 containing powder 101, workpiece 98 and powder 102, is subjected to the compacting action of a ram 104. This compacts the powder mixture against the workpiece and completes the packing. A loosely fitting lid 106 can then be placed over the compacted top of powder 102.

The sequence of loading steps in FIGS. 5A through 5E is readily automated, as by using the automatic advancing and alignment arrangement shown in U.S. Pat. No. 3,253,496 granted May 31, 1966. In fact the introduction of powders 101 and 102 can also be carried out by the arrangement shown in that patent, particularly where the powders are extremely non-fluent.

As in FIG. 1, the loading arrangement illustrated in FIG. 5A and 5E can use powder 101 that has a masking effect, and a powder 102 that causes coating, so that a coating is only applied to the upper or airfoil portion of the workpiece.

Where two different powders are used as in FIG. 5D, the filling of a retort can be effected in inverse manner, the coating powder being introduced into the retort first and the masking or non-coating powder second.

The furnace of the present invention can have its loading and unloading openings in the upper wall of tube 114 instead of the floor, and this modification is helpful where a protective gas, such as argon which is heavier than air, is passed through the tube. Up-tubes are then substituted for down-tubes 155,156 and leakage of argon from tube 114 need not be so carefully guarded against. To this end pump 164 can be omitted. In the up-tubes and engages the sides of the retort or fits against the tapered lower wall 139.

On the other hand, where no protective atmosphere is used, the furnace tube 114 can have loading and unloading passageways in its end walls so that retorts can be more conveniently slid in and out.

Where hydrogen or other combustible gas is continuously passed through tube 114 or through the furnace retort used with the arrangement of FIG. 3, it can be burned at a burner in the muffle 112, so as to help fire the furnace. The muffle or furnace shell can be completely gas-fired, inasmuch as this is less expensive than electric resistance firing at present day costs. Induction heating can also be used and can be applied either to heat the furnace retort of FIG. 3 or the furnace tube 114 of FIG. 4, or can be applied directly to the individual workpiece retorts 10 or 124. Because of their rapid heat up and small size the retort packing arrangements of the present invention is particularly suited for use in the field where a special furnace is not available, yet a jet engine blade must be coated or recoated. The blade can be packed in a closely fitting retort sealed shut but fitted with a vent tube leading into a body of liquid that acts as a bubbler. The retort is then heated in any furnace such as found in a repair shop or even by a gasoline torch or the like, to bring its color temperature to the desired point, and held there for the prescribed time. The heating and decomposition of the activater ingredient in the pack causes gas to be evolved through the bubbler, and when bubbling stops the vent is sealed shut for the remainder of the treatment, until the heating is terminated and the retort cooled and ready for opening. Extra activator can be present in the coating pack for such field use so that gas evolution will continue during the entire heat treatment and sealing of the vent need not be effected until the heating is completed.

Instead of moving retorts through a furnace tube 114 in steps as described in connection with FIG. 4, they can be moved through on a continuous basis at a slow speed. For this purpose it is desirable to have the retorts carried on a moving belt rather than pushed along the floor 116. The belt can be made of wire mesh and be in endless form mounted between two end rollers located at or just beyond the limits of the retort travel. Loading the retorts onto and removal from the belt is readily accomplished through up-tubes located at the ends of furnace tube 114 as described above, or outside the ends of tube 114, where no special atmosphere is maintained during the diffusion coating.

The structural members in the hottest part of the furnace should be made of materials that satisfactorily withstand the high temperatures to which they are exposed. Thus furnace tube 114 as well as the retorts and a conveyor where such is used can be made of materials like Inconel or even thoria-dispersed nickel coated with chromium and aluminum as described in U.S. Pat. No.

3,556,744 for very high temperature use, and of high alloy stainless steels for temperatures below about 1,800°F.

It is not necessary for a workpiece to be entirely covered by powder pack. Thus only the surface portion required to be coated can be packed in the powder coating pack, and the remainder of the workpiece can be completely uncovered. The uncovered portions will then generally pick up a little coating, particularly when the coating is effected with relatively large amounts of energizer in the coating pack, and when the coating is carried out in a glass-sealed retort as in U.S. Pat. No. 2,851,375. Where such pick-up can be tolerated the packing can in this way be simplified. To this end the retort tube 13 can be omitted from the combination of FIG. 1 along with the masking powder 18, and the packed retort tube 11 positioned upside down on tray floor 41 with exposed root 22 projecting up out of that tube. The retort so oriented can also be loaded onto loading plate 140 of the furnace of FIG. 4 for passage therethrough. In the last-mentioned modification it is helpful to equip the furnace tube with thermal curtains that hang from the top of the tube at both ends of the muffle and depend low enough to be engaged by the tops of the retort tubes 11 to reduce thermal losses.

The energizers usually contained in diffusion coating packs are generally halogens or halogen compounds that decompose at fairly low temperatures to gaseous products that purge residual air present in the retort. This purging action begins when a retort is loaded into tube 114. Thus substantial quantities of halogen-containing purging gases and some air are expelled by the retort in position 131. These are flushed out through outlet 162 by the flushing action. To permit this purging, the retort should not be hermetically sealed and in practice it is usual to provide it with a loosely-fitting cover although it can be left uncovered if desired.

Should the energizer content of the pack diffuse away leaving essentially none behind, the coating action sharply diminishes. This characteristic can be used to limit the coating to a period less than that used for the solution heat treatment. However it is preferred to keep the coating thickness down by using less effective coating mixtures. Thus with coatings from an aluminum-chromium pack as described in Canadian Pat. No. 806,618, a prescribed solution heat treatment recipe can be arranged to produce less coating by increasing the proportion of chromium and/or decreasing the proportion of aluminum in the pack.

It is a feature of the present invention that the workpieces are diffusion coated and solution heat treated simultaneously so that reheating to solution heat treating temperatures is not needed. Such reheating is not as effective for solution heat treatment as an original heating. That is to say the strongest products are those that have been given only one heat treatment at solution heat treatment temperatures.

It is another feature of the present invention that individual workpieces in different retorts can be simultaneously subjected to different types of coating treatments, either by the batch operation as in FIG. 3 or the continuous operation as in FIG. 4. To reduce the possibility of cross-contamination retorts having different packs can be spaced from each other and in addition blank retorts can be interposed between them. These blank retorts can contain coated metal powder to help keep contaminants from escaping from the separated retorts. For the batch type operation the longest coating time needed for the different simultaneous coatings is used as the heat treating time, and if any of the coatings requires less time, its pack can have an appropriately less effective pack. In the continuous type treatment this technique can also be used but in addition the times and/or treating temperatures can be changed by controlling the muffle firing and retort advancing action so as to coordinate with the particular retorts being advanced. Also the retorts in a continuously treated series for which different coating temperatures are to be applied, can be separated from each other by blank retorts so that two such different temperature retorts are not in the muffle zone at one time.

The present invention can be practiced with the diffusion coating of aluminum, chromium, tantalum, silicon or any other metal or combinations of metals, and preferably on substrates that like nickel-base superalloys are desirably heat treated. Ordinary high-carbon steels and air hardening tool steels are other examples of such heat-treatable metals although some of these steels are solution treated at about 1,400°F. The following are typical coating-heat treating examples of the present invention:

EXAMPLE I

Coating pack:
- 60 percent by weight chromium powder (325 mesh)
- 20 percent by weight aluminum powder (325 mesh)
- 19.5 percent by weight aluminum oxide powder (325 mesh)
- 0.5 percent by weight ammonium chloride powder (325 mesh)

This pack is heated to 1,950° to 2,000°F for 5 hours in a retort under a flow of hydrogen to break it in. It is then unloaded from the retort, fresh ammonium chloride added, the mix put through a sieve, subsequently tumbled to insure a uniform mixture and used directly for processing. In the arrangement of FIG. 3 is will effect a very protective 0.0030 inch thick coating on IN–738 alloy heated in that powder for 2 hours at 2,050°C. This coating consists mainly of aluminum, chromium and nickel.

EXAMPLE II

Coating pack:
- 20 percent by weight chromium powder
- 79.5 percent by weight aluminum oxide powder
- 0.5 percent by weight ammonium chloride powder The mix was broken in as in Example I at 1,900°F for 5 hours. Then after makeup of the ammonium chloride, it was sifted, tumbled and used to produce at 2,000°F for 4 hours a chromium diffused coating with a case of 0.0012 inch on nickel base superalloys such as B–1900 I (8 percent chromium, 10 percent cobalt, 1 percent titanium, 6 percent aluminum, 6 percent molybdenum, 0.11 percent carbon, 4.3 percent tantalum, 0.15 percent boron, 0.07 percent zirconium, and the balance nickel).

EXAMPLE III

The following mix and process will produce a tantalum diffused coating on nickel base superalloys such as Udimet 700 (15 percent chromium, 18.5 percent cobalt, 3.25 percent titanium, 4.25 percent aluminum, 5 percent molybdenum, 0.1 percent carbon, 0.03 boron, and the remainder nickel).

3 percent by weight chromium powder
10 percent by weight tantalum powder
2.5 percent by weight nickel powder
84 percent by weight aluminum oxide powder
½ percent by weight ammonium chloride powder The mix was broken in as above at 1,850°F for 8 hours followed by makeup, sifting and tumbling prior to use. A case depth of about 0.001 inch was developed on the U-700 superalloy when processed at 2,000°F for 20 hours.

What is claimed:

1. The process of packing an elongated metallic workpiece to have an end portion diffusion coated, which process comprises supporting the workpiece so that one of its ends projects from a support wall, a first metal tube dimensioned so that all portions of the workpiece are within about one inch of a tube wall and some portions are within about one-fourth inch of a tube wall is placed around the projecting end, a pack powder is introduced into the tube and compacted therein to make a coherent non-spilling mass, the workpiece so packed is removed from the support, a second metal tube dimensioned so that all portions of the workpiece are within about one inch of a tube wall and some portions are within about one-fourth inch of a tube wall is placed around the unpacked portion of the workpiece and against the packed tube, and a pack powder is introduced into the second tube and compacted therein, one of said powder packs being a diffusion coating pack.

2. The combination of claim 1 in which the workpiece is a nickel-base superalloy jet engine blade or vane that before use is ordinarily given a solution heat treatment followed by a cooldown at the rate of at least 15°F per minute.

3. The combination of claim 1 in which one tube is packed with a masing pack.

* * * * *

UNITED STATES PATENT AND TRADEMARK OFFICE

CERTIFICATE OF CORRECTION

PATENT NO. : 3,903,338

DATED : SEPTEMBER 2, 1975

INVENTOR(S) : GEORGE COOK ET AL

It is certified that error appears in the above-identified patent and that said Letters Patent are hereby corrected as shown below:

Column 3, sixth line in the second paragraph, "pressure" should be --pressures--.

Column 4, the last two sentences in the second full paragraph should constitute a separate paragraph.

--each retort can be carried by a clamp that opens and closes,--.

Column 10, line 28, "arrangements" should be --arrangement--.

Column 12, line 44, "2050°C" should be --2050°F--.

line 57, the mark preceding the opening parenthesis should be deleted.

Column 13, line 1, before "boron" --percent-- should appear.

Claim 3, line 2, "masing" should be --masking--.

Signed and Sealed this

*sixteenth* Day of *March 1976*

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 3,903,338 Dated September 2, 1975

Inventor(s) George Cook et al.

It is certified that error appears in the above-identified patent and that said Letters Patent are hereby corrected as shown below:

Column 10, line 11, before "and" the following should appear: -- each retort can be carried by a clamp that opens and closes, --.

Signed and Sealed this

*twenty-seventh* Day of *April 1976*

[SEAL]

*Attest:*

RUTH C. MASON
*Attesting Officer*

C. MARSHALL DANN
*Commissioner of Patents and Trademarks*